April 15, 1952  F. N. REYNOLDS, JR., ET AL  2,592,737
MULTIPLEX TELEMETRIC SYSTEM
Filed Oct. 11, 1950  4 Sheets—Sheet 1

INVENTORS
FOSTER N. REYNOLDS, JR
SOL ZECHTZER
MARTIN V. KIEBERT JR
BY
Woodcock and Phelan
ATTORNEYS INVENTORS
FOSTER N. REYNOLDS JR.
SOL ZECHTZER
MARTIN V. KIEBERT JR.
BY
Woodcock and Phelan
ATTORNEYS Patented Apr. 15, 1952

2,592,737

UNITED STATES PATENT OFFICE 2,592,737

MULTIPLEX TELEMETRIC SYSTEM

Foster N. Reynolds, Jr., Upper Darby, and Sol Zechtzer and Martin V. Kiebert, Jr., Philadelphia, Pa., assignors to Raymond Rosen Engineering Products, Inc., Philadelphia, Pa., a corporation of Pennsylvania Application October 11, 1950, Serial No. 189,582

14 Claims. (Cl. 177—351)

1

This invention relates to telemetric systems, and particularly to telemetering systems having at least one multiplexed channel for transmission of information collected by a plurality of pickup devices responsive to pressure, temperature, velocity, strain and other variable physical, electrical or chemical conditions.

In accordance with the present invention, the outputs of the pickup devices are in repeating sequence applied to effect frequency-modulation of a carrier or subcarrier frequency. At the receiving station, the pulsed, frequency-modulated signal is demodulated to produce a repeating series of measuring-information pulses of substantially fixed duration, of substantially fixed spacing and of amplitudes respectively corresponding with the measured variables: the pulses of each series or train are electronically distributed to recorders, indicators or the like respectively corresponding with the pickup devices at the transmitter.

Further, and more specifically in accordance with the invention, the selective distribution of the information pulses to the corresponding recorder or indicating devices is effected electronically by switching pulses normally derived from the pulse train itself but which upon occurrence of "noise" bursts are locally generated to conserve the information not obliterated by the noise and to apply it in proper sequence to the indicators and/or recorders.

For a more detailed understanding of the invention and for illustration of preferred embodiments thereof, reference is made to the accompanying drawings, in which:

Fig. 1A is an explanatory figure referred to in discussion of Fig. 1;

Figure 1:
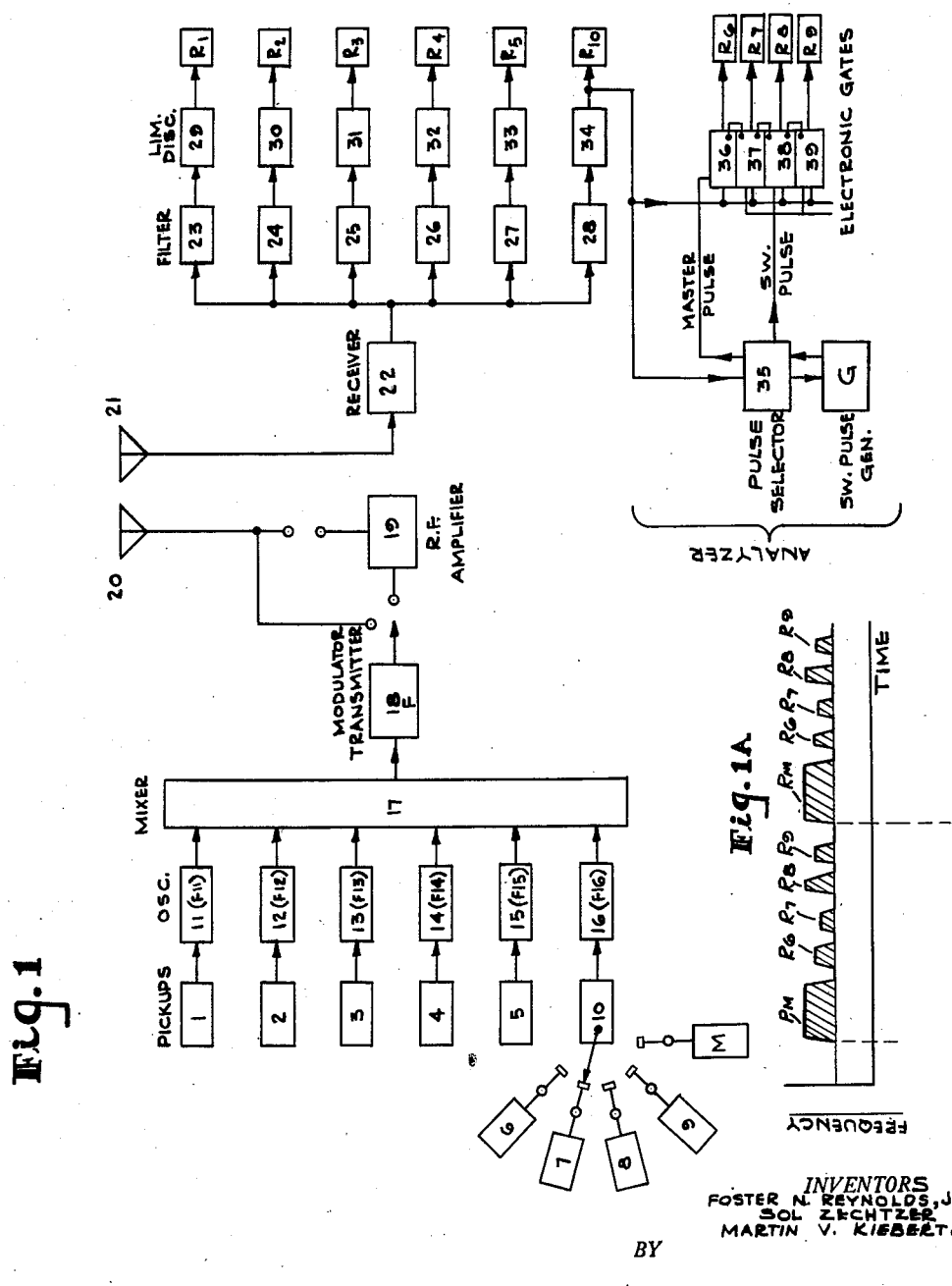
Fig. 1 is a block diagram of a complete telemetric system having six information channels, one of which is multiplexed.

As exemplary of a telemetering system embodying the present invention, reference is made to Fig. 1 which employs six channels for transmission of information collected by nine pickup devices 1 to 9 respectively suited to produce a voltage varying as a function of a measured variable such as temperature, pressure, velocity, azimuth angle, vertical tilt angle, horizontal tilt angle, liquid level, strain and the like. For example, a resistance-thermometer bridge may be used as a pickup suited to produce a voltage varying with temperature; a strain-gage bridge may be used to produce a voltage varying with elonga-

2 tion of structure to which a component resistor is attached: a low torque-potentiometer may be mechanically coupled to the pointer, or movable element, of any meter or primary measuring element to produce a voltage which is a function of the pointer position and therefore of the magnitude of the measured variable.

For transmission of the information to which each of the pickups 1 to 5 respond, its variable output is applied to effect deviation of the center frequency of an associated subcarrier oscillator 11 to 15. Thus, each subcarrier frequency ($F_{11}$ to $F_{15}$) continuously corresponds with the existing magnitude of the condition being monitored by the associated pickup device (1 to 5).

For transmission of the information to which the pickups 6 to 9 respond, their variable outputs are in repeating sequence applied, as by a switching unit 10, to effect corresponding deviations of the frequency of the single subcarrier oscillator 16. Thus, the subcarrier frequency $F_{16}$ in successive intervals of time corresponds with the existing magnitudes of the several conditions being monitored by the pickup devices 6 to 9.

The subcarrier oscillators 11 to 16 are each preferably of the compensated unit type shown in copending application Serial No. 204,026, Etlinger et al.

For reasons which subsequently appear, the center-frequencies of the subcarrier oscillators 11 to 16 are different and at present are in the range of from about 400 to 70,000 cycles per second though the range can readily be extended. The percent deviation above and below center-frequency may be the same for the several channels or may vary for the different channels. Deviation percentages of 7½% and 15% are presently used although higher deviation percentages may be employed.

The choice of the subcarrier center frequencies should take into account the rates of variation of the physical quantities to be measured and the avoidance of confusion between the information of the several channels, by interference between fundamental or harmonic frequencies of these oscillators. In general, for measurement of physical quantities which vary at relatively high rate, the higher frequency subcarriers should be employed and the frequency of a subcarrier should be, as in the case of each of oscillators 11 to 15, a continuous function of the measured variable. When the physical quantities to be measured vary at a relatively low rate, the subcarrier frequency may be low, as within the range of low audio frequencies, and, as in the case of oscillator 16, a step function of a plurality of measured variables which are periodically sampled.

It has been found feasible to obtain reliable data, with aid of interpolation, when the sampling period is as small as one-fourth of the interval required for the variable to swing between its maximum and minimum measured values when varying at its maximum rate. Therefore, it is feasible to impart the information of a relatively large number of pickups, exemplified by pickups 6 to 9, upon a single subcarrier oscillator with elimination of much equipment and without sacrifice of the reliability of the information: such multiplexing conserves also space in the portion of the high-frequency spectrum allocated for telemetering purposes by radio.

The sampling of the outputs of units 6 to 9 for multiplex operation of oscillator 16 is effected by switching unit 10 which may be of mechanical type, such as shown in copending application Serial No. 146,504, or of the electronic gating type.

For purpose later appearing, during each sampling cycle, the unit 10 or equivalent may also sample the output of a reference or standard M to effect a fixed deviation of the frequency of oscillator 16. Thus as shown in Fig. 1A, the time/frequency output of oscillator 16 is a repeating series of spaced pulses, each series consisting of a master pulse MP and a plurality of information pulses P6 et seq. corresponding in number to the pickups in turn coupled to the oscillator by the switching unit. The durations of the information pulses are preferably equal and are substantially shorter than the duration of the master pulse.

For transmission of the telemetric information to a remote receiving point, the outputs of the oscillators 11 to 16 are applied to a mixer 17, amplified if necessary, and the composite output of the mixer applied to frequency modulate the carrier of a transmitter 18 including a radio-frequency oscillator, and if necessary a radio-frequency amplifier 19. The carrier F modulated by the modulated subcarriers $F_{11}$ to $F_{16}$ may be fed to an antenna 20 for radio-link propagation, as in many cases required, for example, in transmission from airborne equipment, or to a wire-link, as is feasible between ground stations.

At the receiving station, the transmitted carrier F is impressed, as by receiving antenna 21, upon a receiver 22 which amplifies it to suitable level and then demodulates it to provide a complex signal including all of the modulated subcarrier frequencies $F_{11}$ et seq. as well as undesirable "noise" incident to propagation and amplification of the carrier. The various subharmonic components of this complex or composite signal are segregated by a corresponding number of band-pass filters 23–28 for selective impression upon the limiter-discriminators 29–34 which convert the frequency deviations of the respective subcarriers to voltage variations applied to the recorders or indicators $R_1$–$R_5$ and $R_{10}$, each of recorders or indicators $R_1$ to $R_5$ receiving an input signal continuously corresponding with the output of a particular pickup at the transmitting station and recorder $R_{10}$ receiving input pulses in a repeating sequence, the amplitude of successive pulses in each train in turn corresponding with the output of a particular pickup at the transmitter.

To segregate from the pulse output of discriminator 34, the particular pulses corresponding to the output of each of pickups 6 to 9 and to apply them to a corresponding recorder or indicator $R_6$ to $R_9$, the output of the discriminator is applied to a series of electronic gates 36 to 39 respectively controlling the transmission of signals to instruments $R_6$ to $R_9$. The opening and closing of the gates at proper time and in proper sequence is normally controlled by the pulse selector 35 upon which the output of discriminator 34 is also impressed. The pulse selector utilizes the master pulse to open the first gate 36 of the series for the time interval when the information corresponding to the first gate appears at its input. A switching pulse derived from the information pulses then turns off the gate and at the same time producing an interchannel master pulse to open the next gate in the chain et seq. This is the known operation of triggered-chain gates and need not further be discussed.

The proper functioning of the multiplexed channel recorder systems depends upon ability of the pulse selector 35 to distinguish between the long duration master pulse and the shorter information pulses. As transmitted, each pulse train, Fig. 1A, has one master pulse and a series of shorter information pulses. However, because of bursts of static or other noise impressed upon the carrier, the output of discriminator 34 may include pseudo-master pulses which not only obliterate the information pulses but also deceive the pulse selector with the result the information of a pulse train is lost or applied in improper sequence to the recorders $R_6$ to $R_9$. This is particularly serious when, as in firing of a missile, the desired information is of short duration and difficult to obtain.

It is a feature of the present invention that upon occurrence of such pseudo-master pulse, the switching pulse or pulses required for proper sequential operation of the electronic gates 36–39 are locally generated by a pulse generator G. It is thus insured that all information of the pulse train not directly obliterated by the noise is applied in proper sequence to the recorders $R_6$–$R_9$ so that each receives the pulse corresponding with the respective pickup at the transmitter.

Figure 2:
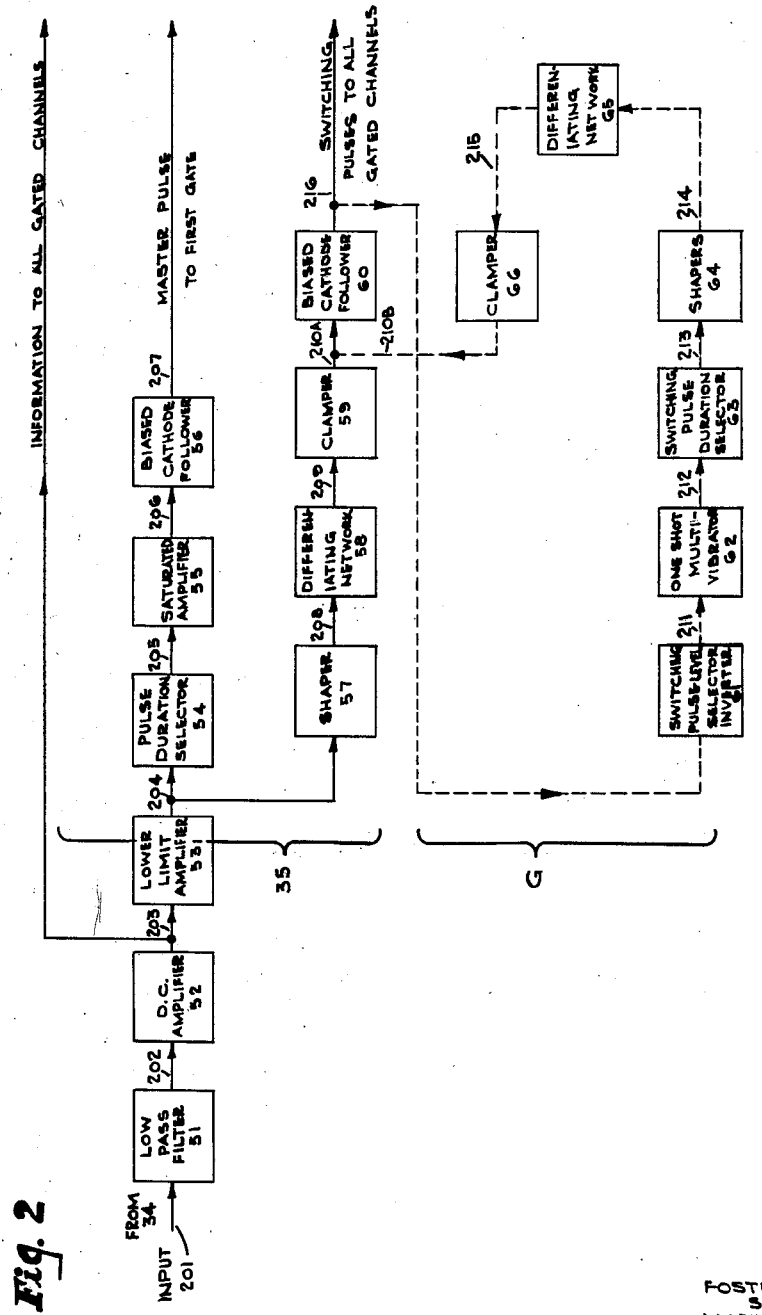
Fig. 2 is a block diagram of an electronic analyzer utilizable in the system of Fig. 1.
Figure 3:
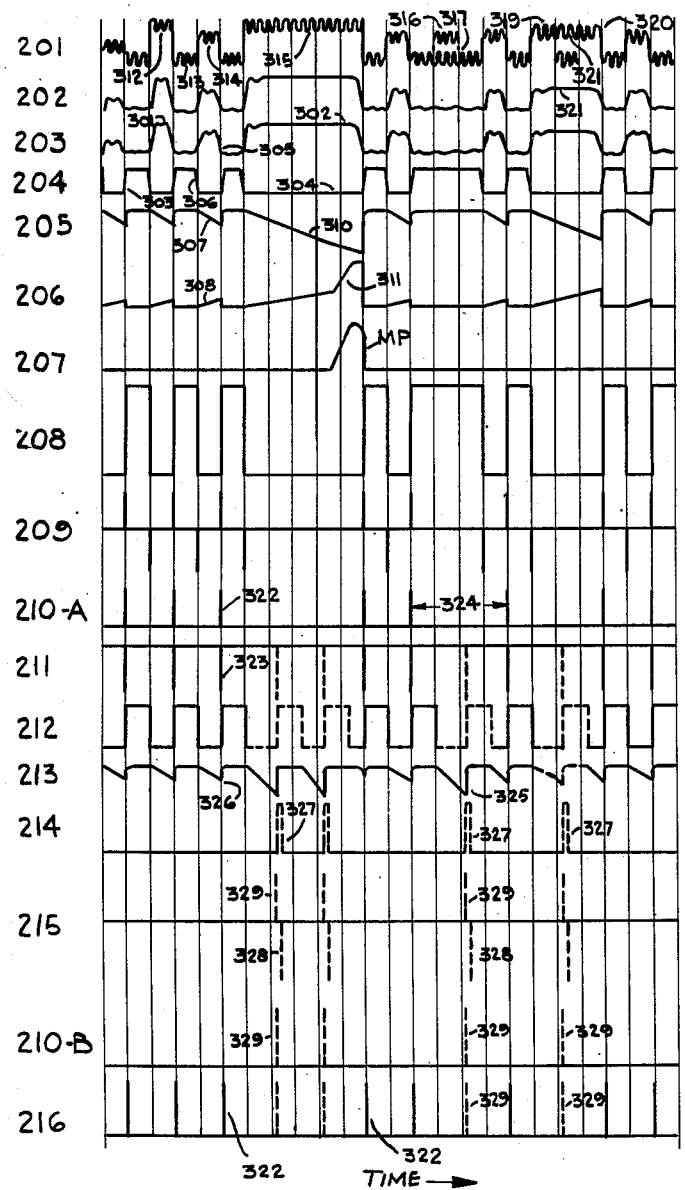
Fig. 3 is an explanatory figure referred to in discussion of Figs. 2 and 4.

For a more detailed discussion of this feature, reference is now made particularly to Fig. 2 which, in block diagram, is illustrative of a preferred pulse-selector and local switching-signal generator and to Fig. 3 which shows the wave forms at correspondingly designated points in the diagram of Fig. 2. It is to be noted that the waveforms of Fig. 3 are based upon a multiplex channel having at least six pickup devices instead of four as specifically illustrated in Fig. 1. In practice, the information collected by as many as twenty-seven pickups has been transmitted over a single multiplexed channel; the number of pickups for a single channel can be still further increased and is limited only by the rate of change of the most rapidly changing measured condition and, in the case of a mechanical switch 10, by the size of the commutator.

In Fig. 3, the received information pulses to the right of the master pulse MP respectively correspond with the outputs of the first six pickups and the information pulses to the left of the master pulse respectively correspond with the outputs of the last three: as later discussed, some of the information pulses of Fig. 3 are obscured by or combined with high level noise bursts.

Referring to Fig. 3, a pulse train 201 as appearing in the output circuit of detector 34 includes a master pulse 315 of fixed amplitude and duration and series of narrow pulses, such as 312, 314, which are of varying amplitude and fixed duration with intervening intervals 313. As indicated by level 317, a pulse 316 may in effect be suppressed or obliterated by noise in which event, in absence of the invention, the switching pulses for triggering the subsequent gates would not be produced and the information contained in the remaining pulses of the train would be lost, because applied to the wrong recorders of the group R₆ et seq. On the other hand, a random noise pulse may raise the blanking level as indicated by 321 to that of adjacent pulses 319, 320 so that again, in absence of the invention, the pulses would take on the characteristics of a master pulse and the corresponding switching pulses would be lost with the result the information of pulses of the train subsequent to pulse 320 would be sent to the wrong recorders because of improper order of triggering of the electronic gates. In the event impulse noise occurs in synchronism with the commutating cycle, causing a missing pulse in each sequence, all of the subsequent information channel recorders would, in absence of the invention, read erroneously for every commutating cycle.

Referring to Fig. 2, the succession of pulse trains 201 comprising the output of the multiplexed channel discriminator 34 are impressed upon a low-pass filter 51 to attenuate, as shown by train 202 of Fig. 3, the low-amplitude background noise. This particular wave train, because of the high-level noise impulses above discussed, has no information pulses 316, 319 and 320 and has a broad pulse 321 not appearing in the signal as emitted by the transmitter 18. The output of filter 51 is impressed on a stable direct-current amplifier 52 provided with suitable means for setting the direct-current level of its input signals. The output 203 (Fig. 3) of the D. C. amplifier 52 consisting of the unobliterated information pulses, the true master pulse 315 and the pseudo master pulse 321 is fed toward all gated channels, as discussed in connection with Fig. 1.

The output 203 of amplifier 52 is also applied to a pulse-duration selector chain, comprising the lower limit amplifier 53, the master pulse duration selector network 54, the saturated amplifier 55 and the output stage 56, which segregates the master pulse 302 of each pulse train 203 for application to the first electronic gate 36, as discussed in connection with Fig. 1.

To derive the interchannel switching pulses 210A from the received signals, the output 204 of the lower-limit amplifier 53 is applied to a switching pulse circuit including shaper 57, differentiator 58, clamper 59 and cathode follower 60. However, as appears from Fig. 3, and because of previously discussed noise conditions existent in the interval including signal pulses 316 to 320, there are lacking from output 210A during the interval as represented by 324 the switching pulses necessary to effect triggering at proper time of the electronic gates for the channels corresponding with those pulses.

To supply the missing interchannel switching pulses, as and when needed, the output of the cathode follower 60, or equivalent, is impressed upon a local pulse-generating chain comprising the selector-inverter 61, multivibrator 62, the switching pulse duration selector 63, shaper 64, differentiator 65 and clamper 66. So long as the multivibrator 62 is triggered by switching pulses derived from the signal, the peak values of the pulse output 213 of the switching pulse duration selector 63 are insufficient to provide a locally generated switching pulse. When, however, a switching pulse does not appear due to change in level of an information pulse by "noise" or to occurrence of a master pulse, the multivibrator 62 is not triggered and the pulse output of the duration-selector 63 rises to higher level 325 and, by action of the differentiating network 65, is converted to a locally generated switching impulse 329, introduced into the input circuit of cathode follower 60.

Thus, if an information pulse is missing because of noise, or other cause, the electronic gates, instead of being triggered in wrong sequence until occurrence of the next master pulse, are triggered in proper sequence so preserving all information not suppressed or observed, as by a noise impulse.

Figure 4:
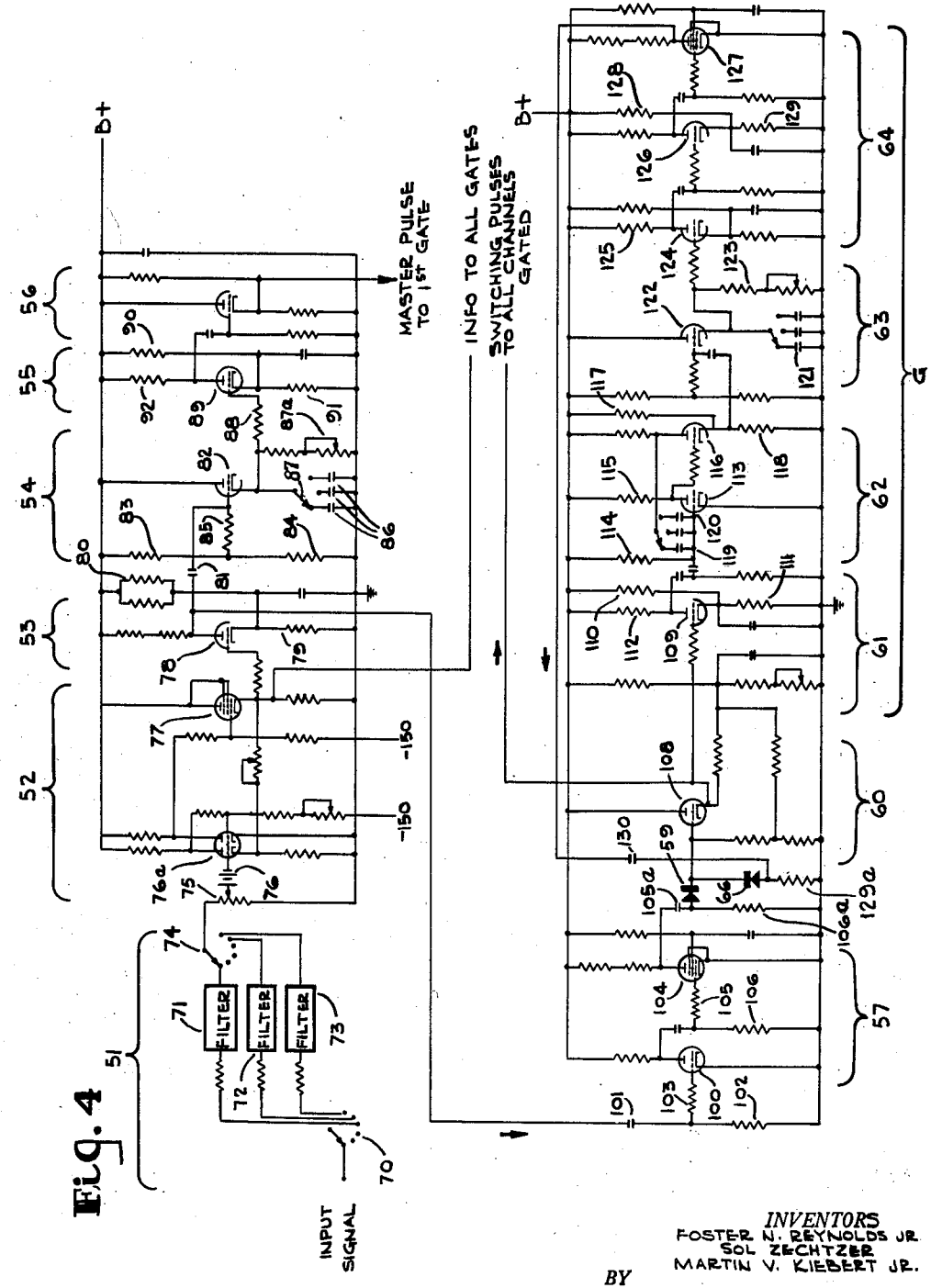
Fig. 4 is a schematic diagram showing circuit components and interconnections of the analyzer of Fig. 3.

As exemplary of a preferred form of analyzer with provision for local generation of missing interchannel switching pulses, and as supplemental explanation of the analyzer system generically shown in Figs. 1 and 2, reference is now made to Fig. 4 whose circuit components are grouped in the block designation of Fig. 2 so that the foregoing discussion of Figs. 2 and 3 is equally applicable to Figs. 3 and 4.

The filter 51 upon which is impressed the pulse output 201 of the limiter-discriminator 34 includes low-pass filters 71 to 73, preferably of non-ringing type selectively included in circuit by switch 70 in dependence upon the subcarrier frequency used in the multiplexed channel.

The filtered signal 202 is impressed upon the input circuit of tube 76a of the stable D. C. amplifier 52. The potentiometer 75 and bias battery 76, or equivalent, provide for setting of the direct-current level of the signals entering the amplifier. The output of tube 76a, which as shown, may provide a dual-amplifier stage, is applied to a cathode-follower stage including tube 77 to provide a low impedance source of the signal 203, normally consisting of a repeating sequence of information pulses 301 and a synchronizing or master pulse 302, fed to all of the electronic gating units.

The output of this cathode follower stage is also applied to the lower-limit amplifier 53 including tube 78 whose cathode is positively biased from the voltage divider 79, 80. The output 204 of amplifier 53 is a train 204 of pulses 303 of constant amplitude and duration (one for each information pulse) and one master pulse 304 of substantially greater duration.

The pulse train 204 is applied through capacitor 81 to the grid of tube 82 of the duration selector circuit 54. The grid of tube 82 is positively biased from the voltage-divider network comprising resistors 83, 84 and 85. The cathode circuit of tube 82 includes a variable resistor 87a connected in shunt, by selector switch 87, to a selected one of capacitors 86 of different magnitude providing the desired duration selection action of the master pulse.

The cathode of tube 82 is coupled by resistor 88 to the grid of tube 89 of the saturated amplifier stage 55. The grid of tube 89 is held at fixed positive potential by a bias derived from the voltage-divider comprising resistors 90, 91.

When the signal at the grid of tube 82 rises, as at 303, the cathode voltage of tube 82 and the grid voltage of tube 89 become more positive than in absence of signal. The circuit parameters for tube 89 are such that it is saturated in absence of signal and thus the positive signal from the cathode of tube 82 simply drives the tube still deeper in the saturation portion of its characteristic. When the signal voltage impressed on the grid of tube 82 falls, as at 306, the anode current of tube 82 is cut off, and the energy stored in capacitor 86 while tube 82 was conductive discharges, in the inter-pulse interval, through the network including resistor 87a at rate determined by the setting of the resistor and the value of the capacitor. The discharging of condenser 86 lowers, as at 307, the positive voltage 205 on the grid of tube 89, taking the tube out of the saturated region of its characteristic and so causes the plate voltage 206 to rise as at 308. The next rise of the signal causes tube 82 again to conduct so again to drive tube 89 into the saturation region.

The time constant of the network 86, 87a is such that for the narrow information pulses, the capacitor 86 loses only a small part of its charge and tube 89 remains in substantially saturated condition. However, during the longer master pulse 304 as appearing on the grid of tube 82, condenser 86 has sufficient time to lose a substantial part of its charge and the grid voltage 205 falls, as at 310, to substantially lower value, driving tube 89 out of saturation. There is thus produced across the plate resistor 92 of tube 89 a large amplitude pulse 311. The output 206 of the saturated amplifier 55 therefore consists of a large pulse 311 for each master pulse of the received signal and a series of smaller pulses, one for each received information pulse.

To preclude triggering of the electronic gates by its smaller pulses, the output 206 is impressed upon a cathode follower stage 56 which is biased so that its output 207 contains only the master switching pulse MP which is applied to the first electronic gate of the series 36 et seq.

The analyzer section, Fig. 4, also provides the inter-channel switching pulses which effect sequential operation of the gates at proper time. Since the repetition frequency of the pulse train is subject to change with variation in speed of commutator or like multiplexing device 10 of the transmitter, the receiver circuits that produce the interchannel switching pulses must not be time-sensitive and should produce switching pulses whose amplitude is fixed despite the variations in amplitude of the information pulses from which they are derived.

As shown in Fig. 3, the output 204 of the lower-limit amplifier 53 consists of constant amplitude pulses corresponding in time with the varying amplitude pulses of the received telemetering signal 201 and thus is suitable for conversion to interchannel switching pulses. The constant level pulses are applied to the input circuit of tube 100, Fig. 4, whose associated circuit elements provide for operation in the saturated portion of its characteristic. The grid resistors 102 and 103 are of magnitude such that the positive and negative peaks of input signal 204 are clipped to produce an output of essentially square waveform. This output is impressed on tube 104 whose associated circuit components effect symmetrical clipping to produce the sharp inverted square wave pulse train 208. Thus, the shaper 57 converts the output 204 of amplifier 53 to the train of pulses 208 of inverted polarity and having sharp leading and trailing edges.

The pulses 208 are differentiated by the network comprising condenser 105A and resistor 106A to produce the sharp short pulses 209, the successive pulses being alternately positive and negative; the positive and negative pulses of each pair corresponding with the leading and trailing edges of a square wave pulse of pulse train 208.

The diode clamper 59 of crystal or tube type, effectively suppresses one pulse 209 of each pair, specifically the negative pulse, and passes the other so that the input 210A applied by the clamper to the biased cathode follower 108 consists of positive pulses in time correspondence with the trailing edges of the pulses in the output 201 of the discriminator 34 of the multiplexed channel. The full-line pulses 322 in the output 216 of the cathode follower 108 are the interchannel switching pulses derived from the received signal and fed to the electronic gates 36 et seq. normally to switch the information pulses to the corresponding recorders R6 et seq.

However, as above previously discussed, in any particular pulse train output of discriminator 34, there may be lacking, because of "noise," the pulses from which would otherwise be derived the interchannel switching pulses necessary for proper sequential operation of the electronic gates. A preferred arrangement for locally generating the missing interchannel switching pulses to insure proper gating is now described.

The output pulses 322 of the biased cathode follower tube 108 in addition to being fed to the electronic gates are also fed to an inverter tube 109 which is normally cut off by the high cathode-bias derived from the voltage-divider comprising resistors 110, 111. When a positive switching pulse 322 is applied to its grid, the tube 109 is driven from the cut-off region to the saturated region of its characteristic so that its output 211, appearing across its anode resistor 112, is a series of negative pulses 323 in time correspondence with the trailing edges of the information pulses in train 201.

The pulses 323 are applied to the input circuit of tube 113 of the "one-shot" multivibrator 62. The cathode of tube 113 is grounded and its grid is at positive potential by virtue of its connection through resistor 114 to the B+ terminal of the source of anode voltage. In absence of signal, tube 113 is therefore conducting and operates in the saturation region of its characteristic. Tube 116 of the multivibrator is normally cut off because of the high positive biasing voltage applied to its cathode by the voltage-divider 117, 118. When a negative pulse 322 is applied to tube 113, its anode current is cut off and the resulting rise in voltage across the anode resistor 115, as applied to the grid of tube 116, causes the latter tube to conduct, with consequent fall of the anode voltage thereof. As the anode of tube 116 is back-coupled through condenser 119 to the grid of tube 113, the latter tube remains cut off for a time depending upon the rate of discharge of capacitor 119 through resistor 114, whereupon, as originally, the tube 113 becomes conductive and the tube 116 reverts to cut-off operation.

The several capacitors 120 and associated switch permit selection of different cut-off periods to suit different sampling or multiplexing rates. The cut-off period is very stable because connection of resistor 114 to the B+ terminal provides for cut-off of tube 113 on the steep portion of the discharge curve of the RC network including condenser 119 and if desired one or more of condensers 120.

The pulse output 212 of the multivibrator 62, as appearing across cathode resistor 118, is applied to the tube 122 of the switching pulse duration selector circuit 63 which is similar in operation to the master pulse duration selector circuit 54. The circuit parameters for tube 122 are such that when the multivibrator 62 is triggered at short intervals by the information-derived pulses of train 212, the selected capacitor 121 in the cathode circuit of tube 122 only partially discharges through resistor 123 before a positive pulse appears to restore conduction of tube 122. In such case, the output 213 of tube 124 is a series of low level pulses 326, the tube operating deep in its saturation region.

When, however, the regularity of pulses 212 is broken by a master pulse or by a noise impulse which blots out the gap between adjacent information pulses, the multivibrator 62 is not triggered at the normal time and the time between two adjacent pulses, as represented by gap 324, is much longer. Under this circumstance, the capacitor 121 has sufficient time to discharge to extend shifting the tube 124 out of saturation and causes that tube to produce the leading edge of a higher level pulse 325. The trailing edge of the higher-level pulse 325 is produced when the multivibrator is triggered, as later described, by a locally-produced switching impulse derived from the leading edge of pulse 325. The output 213 of tube 124 therefore comprises regularly spaced low-level pulses 326 and high-level pulses 325 produced as above described.

The output 213 of the switching pulse-duration selector circuit 63 is applied to the shaper circuit 64 including tubes 126 and 127. The grid of tube 126 is operated with high negative bias derived from resistors 128, 129 so that the lower-level pulses 326 derived from the normal switching pulses are effectively suppressed. The higher-level leading end of pulse 325 is passed by tube 126 and applied to tube 127 which further amplifies it and sharpens the leading edge.

The output 214 of the shaper 64 is applied to the differentiator circuit comprising capacitor 130 and resistor 129a to produce for each pulse 327 a pair of pulses 328, 329 of opposite polarity. The successive pairs forming the output 215 of the differentiator are applied to a clamper diode 66 which suppresses the negative pulses 328 and passes the positive pulses 329, constituting its output 210B, to the tube 108 of the biased cathode follower 60. The clamper diode 66 also isolates the differentiating network 129a, 130 of the local pulse-generator circuit G from the differentiating circuit 105a, 106a of the section 35 which normally derives interchannel switching pulses from the information signal.

The input to tube 108 therefore comprises the signal-derived pulse output 210A and also, under noise conditions, the locally generated pulse output 210B so that the gates 65 et seq. are triggered in proper sequence despite the previously described effects of noise impulses embodied in the demodulated signal output 210 of mixer 34 of the multiplexed channel.

The locally-generated pulses 329 as fed through the cathode follower tube 108 and thence through tube 109 produce sharp negative pulses which trigger the multivibrator 62 in much the same manner as the signal-derived pulses but with a slightly longer interval between a locally generated pulse 329 and a preceding signal-derived pulse 322 than exists between adjacent signal-derived pulses 322. In short, in absence of nor-normal switching pulses, the components 61–66 in effect become a pulse oscillator of frequency somewhat lower than the commutating frequency.

In brief summary, if a normal switching pulse occurs, the multivibrator 62 is triggered but the subsequent elements 63 et seq. of the local pulse-generator circuit are incapacitated before a local switching pulse can be generated and therefore return to standby state without generation of an output pulse, the normal switching pulse 322 effecting the required transition from one gate to the next (Fig. 3, output 216). If a normal switching pulse is missing, the multivibrator 62 is triggered and a locally generated pulse 329 supplied to effect, at proper time, the transition from one gate to the next. Thus, if an information pulse is lost from the received multiplex signal, the gates instead of being triggered in wrong sequence until the next master pulse is received, will continue to be triggered in proper sequence preserving all information possible.

As apparent from the foregoing description, the multiplex analyzer section of the receiver is entirely electronic and free of mechanical commutating devices which enforce use of high sub-carrier frequencies and definitely restrict the number of telemetric information channels than can be accommodated by a single carrier or sub-carrier channels.

What is claimed is:

1. In a multiplexed telemetering system having means for deriving interchannel switching impulses from a signal train of information pulses, means for locally producing a switching impulse missing from said signal train comprising an electronic system suited to generate pulses at repetition rate somewhat slower than the repetition rate of said information pulses, and electronic means upon which said switching impulses are impressed to initiate successive cycles of said local pulse-producing system and to preclude completion thereof so long as the interval between successively applied impulses does not exceed the normal interval between successive information pulses.

2. An arrangement as in claim 1, in which is included a condenser whose discharge through a critical voltage is productive of a local switching impulse, and in which is included a multivibrator connected to interrupt charging of the condenser during the cycle of the multivibrator initiated by the prior switching impulse, as derived from the signal train or as produced by the local pulse-generating system.

3. In a multiplexed telemetering system having means for deriving interchannel switching impulses from a train of information pulses, means for locally producing an interchannel switching impulse in event of obliteration of an information pulse comprising a capacitor-resistor network, a charging circuit for said capacitor, the voltage of said capacitor during discharge for an interval exceeding the normal interval between said pulses passing through a value generative of an interchannel switching impulse, and a multivibrator effective in its cycle to interrupt charging of said capacitor and whose successive cycles are initiated by the switching impulses as derived from the signal or as locally produced.

4. In a multiplexed telemetering system having means for deriving interchannel switching impulses from a signal train of information pulses, means for locally producing an interchannel switching impulse in event of obliteration of an information pulse comprising a critically biased tube, a resistor-capacitor network in the input circuit of said tube, a charging circuit for said capacitor including an electronic tube, said network during discharge for an interval exceeding the normal interval between said pulses passing through the critical bias value of said first-named tube locally to produce an interchannel switching impulse, and a multivibrator triggered by the interchannel switching impulses, signal-derived or locally produced, to control said second-named electronic tube for transition from charging to discharging of said capacitor.

5. A multiplexed telemetering receiver including a stage whose input circuit includes means for deriving interchannel switching impulses from a signal train of information pulses and whose output circuit includes electronic gates to be triggered in sequence corresponding with the information pulses, electronic means connected between said input and output circuits for local generation of switching impulses at repetition rate slightly slower than the repetition rate of said information pulses, and electronic means responsive to regular occurrence of signal-derived switching impulses to preclude local generation of switching impulses by said first-named electronic means.

6. A multiplexed telemetering receiver including a stage whose input circuit includes means for deriving switching pulses from a repeating series of information pulses and whose output circuit includes electronic gates to be triggered in sequence corresponding with the information pulses, and a loop circuit between said input and output circuits including a multivibrator triggered by switching pulses, a resistor-capacitor network in the output circuit of said multivibrator, and a charging circuit for said network, said multivibrator intermittently interrupting charge of said network and effective upon abnormal interval between said switching pulses to cause production of a locally-generated switching impulse by said network.

7. A multiplexed telemetering system including a stage whose input circuit includes means for deriving switching pulses from a repeating series of information pulses and whose output circuit includes electronic gates to be triggered in sequence corresponding with the information pulses, and a local switching pulse generator connected between said input and output circuits including a multivibrator triggered by switching pulses, a duration selector controlled by said multivibrator to produce output pulses when the triggering interval of the multivibrator exceeds the normal interval between successive information pulses, and means for differentiating said output pulses to supply locally-generated switching impulses to said stage.

8. An arrangement as in claim 7 additionally including a clamper diode to suppress the differentiated output pulses of one polarity and to pass the differentiated output pulses of opposite polarity to the input circuit of said stage.

9. In a telemetric receiver for a repeating series of pulses including a master pulse and information pulses and including a series of electronic gates for selective distribution of the pulses to exhibiting instruments, a limiting amplifier for converting all pulses of a series to a corresponding train of fixed amplitude pulses, a circuit between said amplifier and the first gate including a pulse duration selector for passing only the master pulse of the train, a circuit between said amplifier and the other gates including shaping and differentiating networks for deriving switching impulses from said pulse train, and a pulse generator associated with said second circuit, triggered by said switching impulses and effective to produce a switching impulse when the triggering interval exceeds the interval normal for said information pulses.

10. An arrangement as in claim 9, in which the pulse generator includes a resistor-capacitor network, a charging circuit therefor, and a multivibrator triggered by the switching impulses to control the charge and discharge of said network, said network for a discharge interval exceeding the interval normal for said information pulses having a high-amplitude output pulse productive of a locally generated switching impulse.

11. An arrangement as in claim 9, including a limiter amplifier for the output of said network to suppress low-amplitude output pulses thereof corresponding with normal intervals of the information pulses.

12. An arrangement as in claim 9, including means for differentiating the high-amplitude output pulses of said network.

13. An arrangement as in claim 12 including a clamper diode for suppressing the differentiated high-amplitude pulses of one polarity and for passing those of opposite polarity to said other gates.

14. A telemetering system comprising a transmitting station including pickup devices respectively producing electrical outputs respectively corresponding with the values of measured variables, an oscillator, and commutating means subject to time variation of its commutating cycle for repeatedly sequentially applying said outputs to effect frequency-modulation of said oscillator so to produce a signal containing the telemetric information gathered by said pickup devices; and a receiving station comprising means for demodulating said signal to produce trains of information pulses of substantially fixed duration and spacing and of amplitudes respectively corresponding with the outputs of said pickup devices, exhibiting instruments corresponding with said pickup devices, and means for directing the information pulses to the proper corresponding exhibiting instruments comprising tube circuits insensitive to aforesaid time variations of the commutating cycle for deriving switching impulses of fixed amplitude from said varying-amplitude information pulses, a local generator for producing switching impulses at repetition frequency somewhat lower than said information pulses, and electronic means controlled by the switching pulses to incapacitate said local generator so long as said received information pulses recur regularly without suppression or effective joinder by noise.

FOSTER N. REYNOLDS, Jr.
SOL ZECHTZER.
MARTIN V. KIEBERT, Jr.

REFERENCES CITED

The following references are of record in the file of this patent:

UNITED STATES PATENTS

| Number | Name | Date |
|---|---|---|
| 2,083,344 | Newhouse et al. | June 8, 1937 |
| 2,552,629 | Hamming et al. | May 15, 1951 |
| 2,554,886 | Stedman et al. | May 29, 1951 |